US008668611B2

(12) United States Patent
Yang

(10) Patent No.: US 8,668,611 B2
(45) Date of Patent: Mar. 11, 2014

(54) DUAL-DRIVE ELECTRIC MACHINE HAVING CONTROLLABLE EPICYCLE GEAR SET

(76) Inventor: Tai-Her Yang, Dzan-Hwa (TW)

(*) Notice: Subject to any disclaimer, the term of this patent is extended or adjusted under 35 U.S.C. 154(b) by 211 days.

(21) Appl. No.: 13/033,753

(22) Filed: Feb. 24, 2011

(65) Prior Publication Data

US 2012/0220410 A1 Aug. 30, 2012

(51) Int. Cl.
F16H 48/30 (2012.01)
F16H 48/06 (2006.01)

(52) U.S. Cl.
USPC .......................................... 475/150; 475/154

(58) Field of Classification Search
USPC .............. 475/5, 149, 150, 151, 154, 230, 317
See application file for complete search history.

(56) References Cited

U.S. PATENT DOCUMENTS

| 6,251,037 | B1* | 6/2001 | Baumgaertner et al. | 475/2 |
| 6,346,784 | B1* | 2/2002 | Lin | 318/9 |
| 6,732,526 | B2* | 5/2004 | Minagawa et al. | 60/706 |
| 6,910,981 | B2* | 6/2005 | Minagawa et al. | 475/5 |
| 7,276,005 | B2* | 10/2007 | Morikawa | 475/5 |
| 7,497,286 | B2* | 3/2009 | Keller et al. | 180/65.6 |
| 2008/0058145 | A1* | 3/2008 | Holmes | 475/5 |
| 2008/0058149 | A1* | 3/2008 | Yang | 475/230 |
| 2010/0331130 | A1* | 12/2010 | Tsyganov | 475/5 |
| 2012/0220409 | A1* | 8/2012 | Yang | 475/149 |
| 2012/0220411 | A1* | 8/2012 | Yang | 475/154 |
| 2012/0220412 | A1* | 8/2012 | Yang | 475/156 |
| 2012/0220413 | A1* | 8/2012 | Yang | 475/156 |

FOREIGN PATENT DOCUMENTS

FR 2844858 A1 * 3/2004

OTHER PUBLICATIONS

English translation of FR2844858A1, http://translationportal.epo.org, Oct. 17, 2013.*

* cited by examiner

Primary Examiner — Roger Pang
(74) Attorney, Agent, or Firm — Bacon & Thomas, PLLC

(57) ABSTRACT

The present invention is structured by a dual-drive electric machine being combined with an epicycle gear set (EG101) and a controllable brake device, through controlling the controllable brake device to perform brake locking or releasing, the operations of transmission function of combining transmission or releasing between a rotation shaft (S101) at an output/input end, a rotation shaft (S102) at an output/input end and a sleeve type rotation shaft (AS101) at an output/input end of the epicycle gear set (EG101) are enabled to be controlled, and the interacting operation between the dual-drive electric machine (EM100) and the output/input ends are also enabled to be controlled.

18 Claims, 3 Drawing Sheets

DUAL-DRIVE ELECTRIC MACHINE HAVING CONTROLLABLE EPICYCLE GEAR SET

BACKGROUND OF THE INVENTION (a) Field of the Invention

The present invention is structured by a dual-drive electric machine being combined with an epicycle gear set (EG101) and a controllable brake device, through controlling the controllable brake device to perform brake locking or releasing, the operations of transmission function of combining transmission or releasing between a rotation shaft (S101) at an output/input end, a rotation shaft (S102) at an output/input end and a sleeve type rotation shaft (AS101) at an output/input end of the epicycle gear set (EG101) are enabled to be controlled, and the interacting operation between the dual-drive electric machine (EM100) and the output/input ends are also enabled to be controlled.

(b) Description of the Prior Art

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

SUMMARY OF THE INVENTION

The present invention provides a dual-drive electric machine having a controllable epicycle gear set, in which an inner rotation part of electric machine (EM101) of the dual-drive electric machine (EM100) is combined with an input wheel (W101) of an epicycle gear set (EG101) and a rotation shaft (S101) shared by the above two is served as an output/input end, a rotation shaft (S102) combined with an output wheel (W102) is served as an output/input end, and a rocker arm (A101) linked by an epicycle wheel (W103) of the epicycle gear set (EG101) combined with an outer rotation part of electric machine (EM102) and combined with a sleeve type rotation shaft (AS101) is served as an output/input end, so that a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the epicycle gear set (EG101) are enabled to be controlled, and the interactive operations between the dual-drive electric machine (EM100) and the output/input ends are also enabled to be controlled.

DESCRIPTION OF MAIN COMPONENT SYMBOLS

A101: Rocker arm
AS101: Sleeve type rotation shaft
BK101, BK102, BK103: Controllable brake device
EG101: Epicycle gear set
EM100: Dual-drive electric machine
EM101: Inner rotation part of electric machine
EM102: Outer rotation part of electric machine
H100: Housing
S101 S102: Rotation shaft
W101: Input wheel
W102: Output wheel
W103: Epicycle wheel

DETAILED DESCRIPTION OF THE PREFERRED EMBODIMENTS

Conventionally, a friction type electromagnetic clutch device is often installed between the output/input end of a rotation electric machine and a load; and through electrically charging or breaking the friction type electromagnetic clutch device to perform operations of combining or releasing, the load is enabled to engaged or released with the rotary electric machine. One primary disadvantage of the conventional arts is that residual rotary torque is often remained during the releasing, which may cause the kinetic energy loss and the ineffective operation.

The present invention provides a dual-drive electric machine having a controllable epicycle gear set, in which an inner rotation part of electric machine (EM101) of the dual-drive electric machine (EM100) is combined with an input wheel (W101) of an epicycle gear set (EG101) and a rotation shaft (S101) shared by the above two is served as an output/input end, a rotation shaft (S102) combined with an output wheel (W102) is served as an output/input end, and a rocker arm (A101) linked by an epicycle wheel (W103) of the epicycle gear set (EG101) combined with an outer rotation part of electric machine (EM102) and combined with a sleeve type rotation shaft (AS101) is served as an output/input end, so that a part or all of the three output/input ends are respectively connected to an action side of a corresponding controllable brake device, and the other action side of the controllable brake device is connected to a housing (H100); through controlling the controllable brake device to perform brake locking or releasing, the operations of transmission function of connecting transmission or releasing between the rotation shaft (S101) at the output/input end, the rotation shaft (S102) at the output/input end and the sleeve type rotation shaft (AS101) at the output/input end of the epicycle gear set (EG101) are enabled to be controlled, and the interactive operation between the dual-drive electric machine (EM100) and the output/input ends are also enabled to be controlled.

Figure 1:
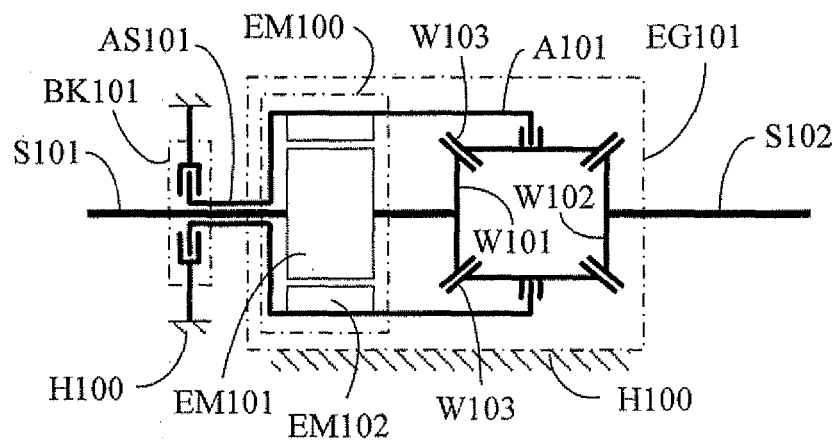
FIG. 1 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, the rocker arm (A101) linked by the epicycle wheel (W103) being combined with the outer rotation part of electric machine (EM102) and combined with the sleeve type rotation shaft (AS101), and the sleeve type rotation shaft (AS101) rotated and sleeved on the rotation shaft (S101) being served as an output/input end and connected to an action side of the controllable brake device (BK101), and the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end, according to one embodiment of the present invention.

The structures and embodiments of the dual-drive electric machine having controllable epicycle gear set of the present invention are disclosed as followings:

FIG. 1 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, the rocker arm (A101) linked by the epicycle wheel (W103) being combined with the outer rotation part of electric machine (EM102) and combined with the sleeve type rotation shaft (AS101), and the sleeve type rotation shaft (AS101) rotated and sleeved on the rotation shaft (S101) being served as an output/input end and connected to an action side of the controllable brake device (BK101), and the other action side of the controllable brake device (BK101) being fixed in the housing (H100), the epicycle gear set (EG101) also being fixed in the housing (H100), and the output wheel (W102) of the epicycle gear set (EG101) being provided for driving the rotation shaft (S102) to be served as an output/input end, according to one embodiment of the present invention.

As show in FIG. 1, it mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, the rocker arm (A101) linked by the epicycle wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101), and the other action side of the controllable brake device (BK101) is fixed in the housing (H100), the output wheel (W102) of the epicycle gear set (EG101) is provided for driving the rotation shaft (S102) to be served as an output/input end, and the rotation shaft (S101) connected with the input wheel (W101) is also served as an output/input end;

According to the embodiment shown in FIG. 1, the operations of the dual-drive electric machine having controllable epicycle gear set of the present invention include one or more than one of following functions:

When the controllable brake device (BK101) is controlled to be in the releasing state, and the dual-drive electric machine (EM100) is not operated with the electric machinery function, the transmission relations between the rotation shaft (S101) and the rotation shaft (S102) and the sleeve type rotation shaft (AS101) are in the releasing state allowing idle rotation;

When the controllable brake device (BK101) is controlled to be in the releasing state, and the dual-drive electric machine (EM100) is operated with the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state, and the dual-drive electric machine (EM100) is not operated with the electric machinery function, the transmission relation between the rotation shaft (S101) and the rotation shaft (S102) is in a connecting relation allowing for transmission;

When the controllable brake device (BK101) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the rotation shaft (S102);

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 2:
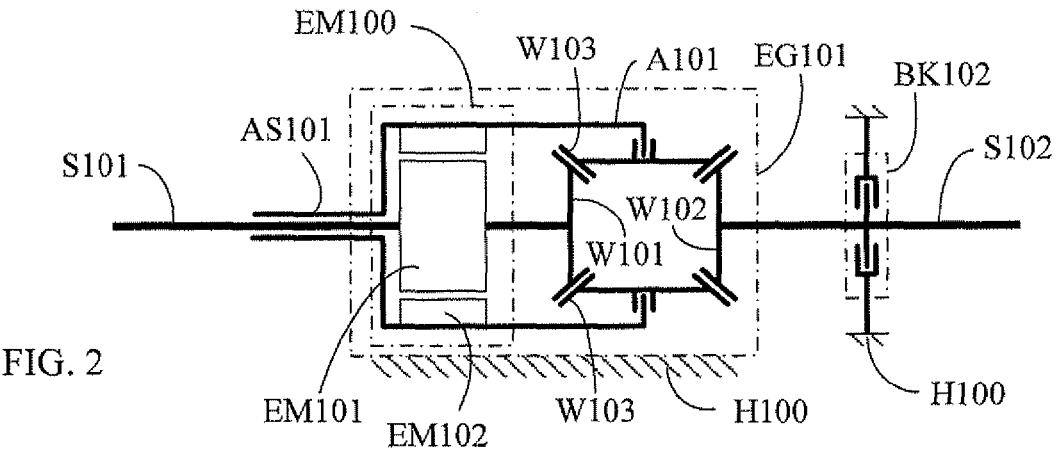
FIG. 2 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, the rocker arm (A101) linked by the epicycle wheel (W103) being combined with the outer rotation part of electric machine (EM102) and combined with the sleeve type rotation shaft (AS101), and the sleeve type rotation shaft (AS101) sleeved on the rotation shaft (S101) being served as an output/input end, and the output wheel (W102) of the epicycle gear set (EG101) being provided for driving the rotation shaft (S102) to be served as an output/input end, the rotation shaft (S102) being connected to an action side of the controllable brake device (BK102), and the other action side of the controllable brake device (BK102) being fixed in the housing (H100), according to one embodiment of the present invention.

FIG. 2 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, the rocker arm (A101) linked by the epicycle wheel (W103) being combined with the outer rotation part of electric machine (EM102) and combined with the sleeve type rotation shaft (AS101), and the sleeve type rotation shaft (AS101) sleeved on the rotation shaft (S101) being served as an output/input end, and the output wheel (W102) of the epicycle gear set (EG101) being provided for driving the rotation shaft (S102) to be served as an output/input end, the rotation shaft (S102) being connected to an action side of the controllable brake device (BK102), and the other action side of the controllable brake device (BK102) being fixed in the housing (H100), according to one embodiment of the present invention.

As show in FIG. 2, it mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, the rocker arm (A101) linked by the epicycle wheel (W103) is combined with the outer rotation part of electric machine (EM102) and combined with the sleeve type rotation shaft (AS101), and the sleeve type rotation shaft (AS101) is rotated and sleeved on the rotation shaft (S101) for being served as an output/input end;

The output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 2, the operations of the dual-drive electric machine having controllable epicycle gear set of the present invention include one or more than one of following functions:

When the controllable brake device (BK102) is controlled to be in the releasing state, and the dual-drive electric machine (EM100) is not operated with the electric machinery function, the transmission relations between the rotation shaft (S101) and the sleeve type rotation shaft (AS101) and the rotation shaft (S102) are in the releasing state allowing idle rotation;

When the controllable brake device (BK102) is controlled to be in the releasing state, and the dual-drive electric machine (EM100) is operated with the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK102) is controlled to be in the brake locking state, and the dual-drive electric machine (EM100) is not operated with the electric machinery function, the transmission relation between the rotation shaft (S101) and the sleeve type rotation shaft (AS101) is in a connecting relation allowing for transmission;

When the controllable brake device (BK102) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 3:
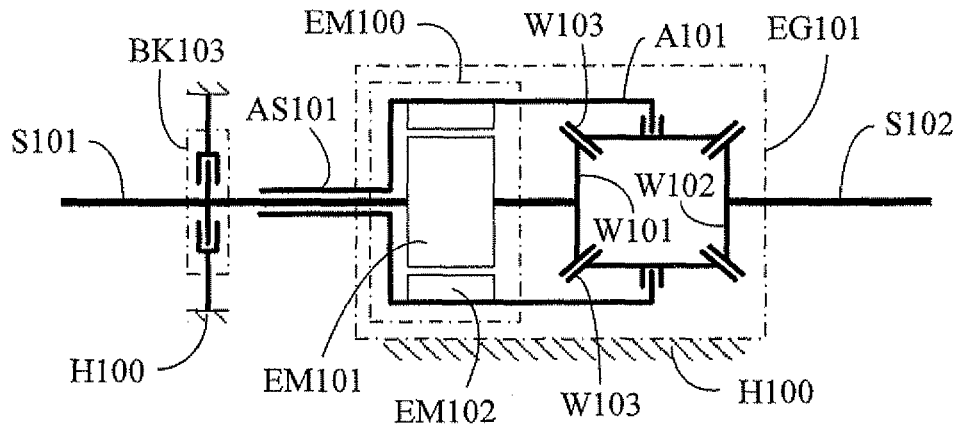
FIG. 3 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end for connecting with an action side of the controllable brake device (BK103), the other action side of the controllable brake device (BK103) being fixed in the housing (H100), the epicycle gear set (EG101) also being fixed in the housing (H100), the epicycle wheel (W103) of the epicycle gear set (EG101) being provided for linking the rocker arm (A101) and combined with the outer rotation part of electric machine (EM102) and the sleeve type rotation shaft (AS101), and the sleeve type rotation shaft (AS101) being served as an output/input end, and the output wheel (W102) of the epicycle gear set (EG101) being provided for driving the rotation shaft (S102) to be served as an output/input end, according to one embodiment of the present invention.

FIG. 3 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end for connecting with an action side of the controllable brake device (BK103), and the other action side of the controllable brake device (BK103) being fixed in the housing (H100); the epicycle gear set (EG101) also being fixed in the housing (H100), the epicycle wheel (W103) of the epicycle gear set (EG101) being provided for linking the rocker arm (A101) and combined with the outer rotation part of electric machine (EM102) and the sleeve type rotation shaft (AS101), and the sleeve type rotation shaft (AS101) being served as an output/input end, and the output wheel (W102) of the epicycle gear set (EG101) being provided for driving the rotation shaft (S102) to be served as an output/input end, according to one embodiment of the present invention.

As show in FIG. 3, it mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end for connecting with an action side of the controllable brake device (BK103) while the other action side of the controllable brake device (BK103) is fixed in the housing (H100);

The epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) is rotated and sleeved on the rotation shaft (S101) for being served as an output/input end, the output wheel (W102) of the epicycle gear set (EG101) is provided for driving the rotation shaft (S102) to be served as an output/input end, and the rotation shaft (S101) connected with the input wheel (W101) is also served as an output/input end;

The operations of the dual-drive electric machine having controllable epicycle gear set shown in FIG. 3 include one or more than one of following functions:

When the controllable brake device (BK103) is controlled to be in the releasing state, and the dual-drive electric machine (EM100) is not operated with the electric machinery function, the transmission relations between the rotation shaft (S101) and the sleeve type rotation shaft (AS101) and the rotation shaft (S102) are in the releasing state allowing idle rotation;

When the controllable brake device (BK103) is controlled to be in the releasing state, and the dual-drive electric machine (EM100) is operated with the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state, and the dual-drive electric machine (EM100) is not operated with the electric machinery function, the transmission relation between the sleeve type rotation shaft (AS101) and the rotation shaft (S102) is in a connecting relation allowing for transmission;

When the controllable brake device (BK103) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the sleeve type rotation shaft (AS101) and the rotation shaft (S102);

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 4:
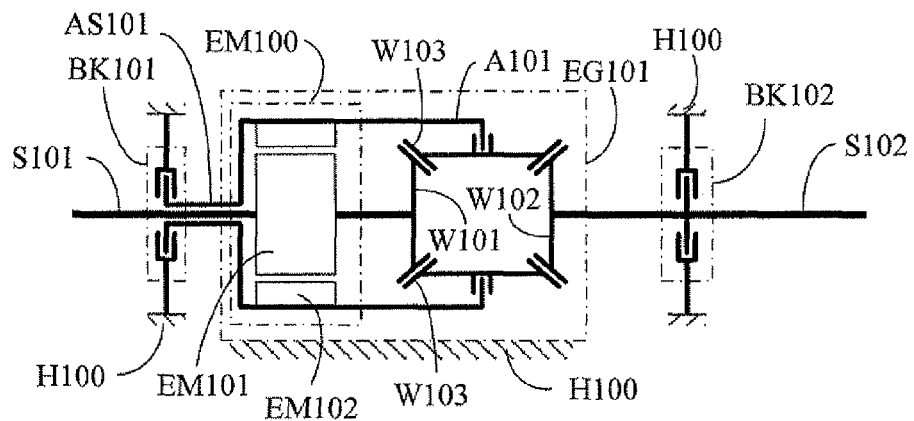
FIG. 4 is a schematic structural view showing the controllable brake device (BK102) being further installed between the rotation shaft (S102) and the housing (H100) as shown in FIG. 1.

FIG. 4 is a schematic structural view showing the controllable brake device (BK102) being further installed between the rotation shaft (S102) and the housing (H100) as shown in FIG. 1.

As shown in FIG. 4, the rotation shaft (S101) shared by the input wheel (W101) of the epicycle gear set (EG101) and the inner rotation part of electric machine (EM101) of the dual-drive electric machine (EM100) is served as an output/input end, the rocker arm (A101) linked by the epicycle wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, the sleeve type rotation shaft (AS101) is connected with an action side of the controllable brake device (BK101), and the other action side of the controllable brake device (BK101) is fixed in the housing (H100), the epicycle gear set (EG101) is also fixed in the housing (H100), the output wheel (W102) of the epicycle gear set (EG101) is provided for driving the rotation shaft (S102) to be served as an output/input end, and the rotation shaft (S102) is connected to an action side of the controllable brake device (BK102), and the other action side of the controllable brake device (BK102) is fixed in the housing (H100), which mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100); or The speed ratios of the input wheel (W101) and the output wheel (W102) of the mentioned epicycle gear set (EG101) are the same, and the speed ratios between the above two and the epicycle wheel (W103) can be the same or different;

The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101) while the other action side is fixed in the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, the output wheel (W102) of the epicycle gear set (EG101) combined with the rotation shaft (S102) is served as an output/input end, the rocker arm (A101) linked by the epicycle wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101), and the other action side of the controllable brake device (BK101) is fixed in the housing (H100), and the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

According to the embodiment shown in FIG. 4, the operations of the dual-drive electric machine having controllable epicycle gear set of the present invention include one or more than one of following functions:

When the controllable brake device (BK101) and the controllable brake device (BK102) are both controlled to be in the releasing state, and the dual-drive electric machine (EM100) is not operated with the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK102) are both controlled to be in the releasing state, and the dual-drive electric machine (EM100) is operated with the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK102) is controlled to be in the releasing state, and the dual-drive electric machine (EM100) is not operated with the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK102) is controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the rotation shaft (S102);

When the controllable brake device (BK101) is controlled to be in the releasing state and the controllable brake device (BK102) is controlled to be in the brake locking state, and the dual-drive electric machine (EM100) is not operated with the electric machinery function, the transmission relation between the rotation shaft (S101) and the sleeve type rotation shaft (AS101) is in a connecting relation allowing for transmission;

When the controllable brake device (BK101) is controlled to be in the releasing state and the controllable brake device (BK102) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state.

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 5:
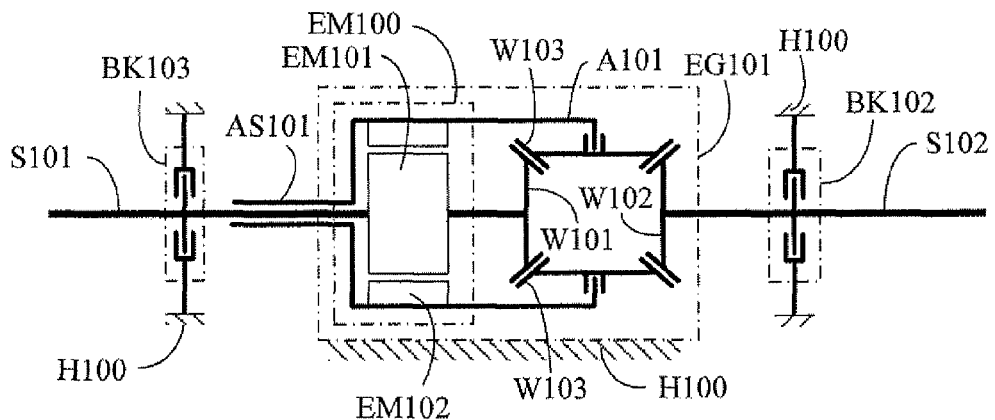
FIG. 5 is a schematic structural view showing the controllable brake device (BK103) being further installed between the rotation shaft (S101) and the housing (H100) as shown in FIG. 2.

FIG. 5 is a schematic structural view showing the controllable brake device (BK103) being further installed between the rotation shaft (S101) and the housing (H100) as shown in FIG. 2.

As shown in FIG. 5, the rotation shaft (S101) shared by the input wheel (W101) of the epicycle gear set (EG101) and the inner rotation part of electric machine (EM101) of the dual-drive electric machine (EM100) is served as an output/input end, and is connected to an action side of the controllable brake device (BK103), and the other action side of the controllable brake device (BK103) is fixed in the housing (H100), and the epicycle gear set (EG101) is also fixed in the housing (H100), and the epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102) while the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, and is connected to an action side of the controllable brake device (BK103), and the other action side of the controllable brake device (BK103) is fixed in the housing (H100); the output wheel (W102) of the epicycle gear set (EG101) is combined with the rotation shaft (S102) for being served as an output/input end, and is connected to an action side of the controllable brake device (BK102), and the other action side of the controllable brake device (BK102) is fixed in the housing (H100); the rocker arm (A101) linked by the epicycle wheel (W103) is combined with the outer rotation part of electric machine (EM102) and combined with the sleeve type rotation shaft (AS101), and the sleeve type rotation shaft (AS101) rotated and sleeved on the rotation shaft (S101) is served as an output/input end;

The operations of the dual-drive electric machine having controllable epicycle gear set as shown in FIG. 5 include one or more than one of following functions:

When the controllable brake device (BK102) and the controllable brake device (BK103) are both controlled to be in the releasing state, and the dual-drive electric machine (EM100) is not operated with the electric machinery function, the transmission relations between the rotation shaft (S101) and the rotation shaft (S102) and the sleeve type rotation shaft (AS101) are in the releasing state allowing idle rotation;

When the controllable brake device (BK102) and the controllable brake device (BK103) are both controlled to be in the releasing state, and the dual-drive electric machine (EM100) is operated with the electric machinery function, the corresponding interactive operation of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK103) is controlled to be in the brake locking state and the controllable brake device (BK102) is controlled to be in the releasing state, and the dual-drive electric machine (EM100) is not operated with the electric machinery function, the transmission relation between the sleeve type rotation shaft (AS101) and the rotation shaft (S102) is in a connecting relation allowing for transmission;

When the controllable brake device (BK103) is controlled to be in the brake locking state and the controllable brake device (BK102) is controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function performed, for performing corresponding interactive operations with the damping of external load or the externally inputted rotary kinetic energy sustained by the sleeve type rotation shaft (AS101) and the rotation shaft (S102);

When the controllable brake device (BK103) is controlled to be in the releasing state and the controllable brake device (BK102) is controlled to be in the brake locking state, and the dual-drive electric machine (EM100) is not operated with the electric machinery function, the transmission relation between the rotation shaft (S101) and the sleeve type rotation shaft (AS101) is in a connecting relation allowing for transmission;

When the controllable brake device (BK103) is controlled to be in the releasing state and the controllable brake device (BK102) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state;

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 6:
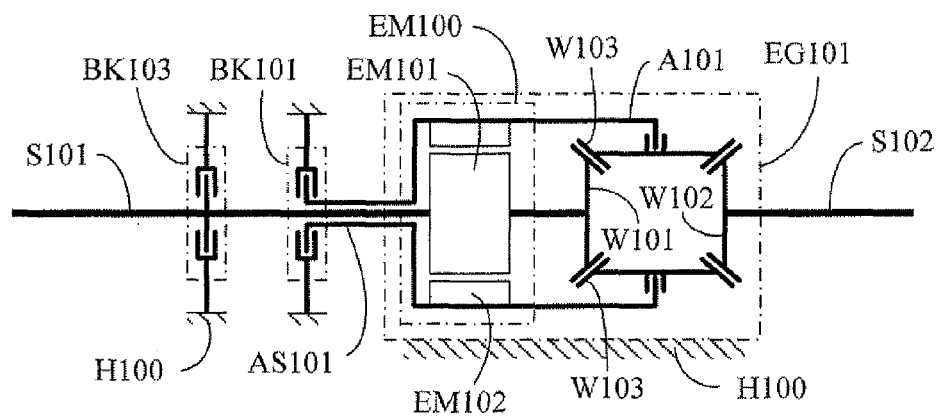
FIG. 6 is a schematic structural view showing the controllable brake device (BK101) being further installed between the sleeve type rotation shaft (AS101) and the housing (H100) as shown in FIG. 3.

FIG. 6 is a schematic structural view showing the controllable brake device (BK101) being further installed between the sleeve type rotation shaft (AS101) and the housing (H100) as shown in FIG. 3.

As shown in FIG. 6, the rotation shaft (S101) shared by the input wheel (W101) of the epicycle gear set (EG101) and the inner rotation part of electric machine (EM101) of the dual-drive electric machine (EM100) is served as an output/input end for connecting with an action side of the controllable brake device (BK103), and the other action side of the controllable brake device (BK103) is fixed in the housing (H100); the epicycle wheel (W103) of the epicycle gear set (EG101) is provided for linking the rocker arm (A101) and combined to the outer rotation part of electric machine (EM102) and combined to the sleeve type rotation shaft (AS101), and the sleeve type rotation shaft (AS101) is rotated and combined on the rotation shaft (S101) for being served as an output/input end, and the sleeve type rotation shaft (AS101) is connected to an action side of the controllable brake device (BK101), and the other action side of the controllable brake device (BK101) is fixed in the housing (H100), and the shell of the epicycle gear set (EG101) is also fixed in the housing (H100), and the output wheel (W102) of the epicycle gear set (EG101) is provided for driving the rotation shaft (S102) to be served as an output/input end, which mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101) while the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, and is served for connecting to an action side of the controllable brake device (BK103) while the other action side of the controllable brake device (BK103) is fixed in the housing (H100);

The epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) is rotated and sleeved on the rotation shaft (S101) for being served as an output/input end, and the sleeve type rotation shaft (AS101) is connected to an action side of the controllable brake device (BK101) while the other action side of the controllable brake device (BK101) is fixed in the housing (H100), and the output wheel (W102) of the epicycle gear set (EG101) is provided for driving the rotation shaft (S102) to be served as an output/input end.

The operations of the dual-drive electric machine having controllable epicycle gear set as shown in FIG. 6 include one or more than one of following functions:

When the controllable brake device (BK101) and the controllable brake device (BK103) are both controlled to be in the releasing state, and the dual-drive electric machine (EM100) is not operated with the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK103) are both controlled to be in the releasing state, and the dual-drive electric machine (EM100) is operated with the electric machinery function, the corresponding interactive operation of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state and the controllable brake device (BK103) is controlled to be in the releasing state, and the dual-drive electric machine (EM100) is not operated with the electric machinery function, the transmission relation between the rotation shaft (S101) and the rotation shaft (S102) is in a connecting relation allowing for transmission;

When the controllable brake device (BK101) is controlled to be in the brake locking state and the controllable brake device (BK103) is controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the rotation shaft (S102);

When the controllable brake device (BK101) is controlled to be in the releasing state and the controllable brake device (BK103) is controlled to be in the brake locking state, and the dual-drive electric machine (EM100) is not operated with the electric machinery function, the transmission relation between the rotation shaft (S102) and the sleeve type rotation shaft (AS101) is in a connecting relation allowing for transmission;

When the controllable brake device (BK101) is controlled to be in the releasing state and the controllable brake device (BK103) is controlled to be in the brake locking state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

When the controllable brake device (BK101) and the controllable brake device (BK102) are both controlled to be in the brake locking state, the relations between the rotation shaft (S101), the rotation shaft (S102) and the sleeve type rotation shaft (AS101) are all in the brake locking state.

The interactive operations of corresponding function performed by the mentioned dual-drive electric machine (EM100) include receiving the driving control of externally inputted electric energy, operating as the motor function for individually driving the load, or working with the externally inputted rotary kinetic energy for commonly driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

Figure 7:
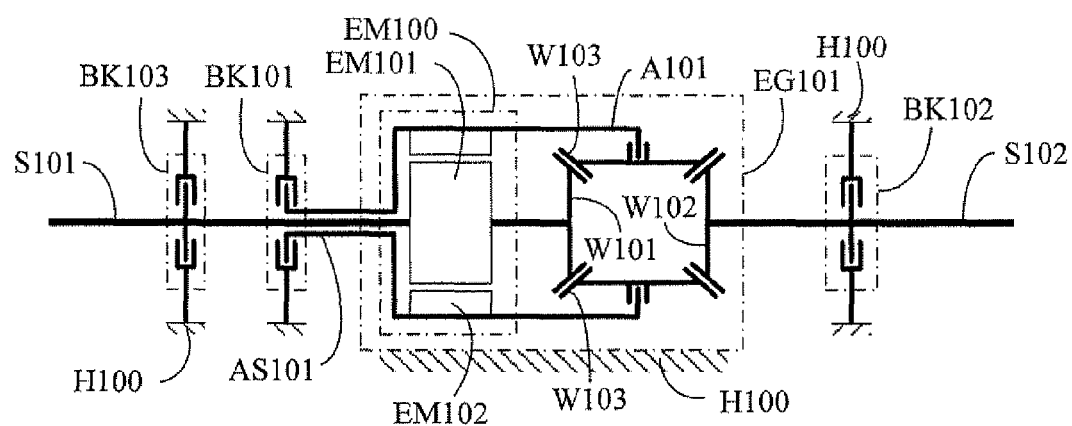
FIG. 7 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, and served for connecting with an action side of the controllable brake device (BK103) while the other action side of the controllable brake device (BK103) being fixed in the housing (H100), and the epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) being rotated and sleeved on the rotation shaft (S101) for being served as an output/input end, and the sleeve type rotation shaft (AS101) being connected to an action side of the controllable brake device (BK101), and the other action side of the controllable brake device (BK101) being fixed in the housing (H100), and the epicycle gear set (EG101) also being fixed in the housing (H100), and the output wheel (W102) of the epicycle gear set (EG101) being provided for driving the rotation shaft (S102) to be served as an output/input end, and served for connecting with an action side of the controllable brake device (BK102), and the other action side of the controllable brake device (BK102) being fixed in the housing (H100), according to one embodiment of the present invention.

FIG. 7 is a schematic structural view showing the rotation shaft (S101) shared by the input wheel (W101) of the epicycle gear set (EG101) and the inner rotation part of electric machine (EM101) of the dual-drive electric machine (EM100) being served as an output/input end, and served for connecting with an action side of the controllable brake device (BK103) while the other action side of the controllable brake device (BK103) being fixed in the housing (H100), and the epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) being rotated and sleeved on the rotation shaft (S101) for being served as an output/input end, and the sleeve type rotation shaft (AS101) being connected to an action side of the controllable brake device (BK101), and the other action side of the controllable brake device (BK101) being fixed in the housing (H100), and the epicycle gear set (EG101) also being fixed in the housing (H100), and the output wheel (W102) of the epicycle gear set (EG101) being provided for driving the rotation shaft (S102) to be served as an output/input end, and served for connecting with an action side of the controllable brake device (BK102), and the other action side of the controllable brake device (BK102) being fixed in the housing (H100), according to one embodiment of the present invention.

As shown in FIG. 7, the rotation shaft (S101) shared by the input wheel (W101) of the epicycle gear set (EG101) and the inner rotation part of electric machine (EM101) of the dual-drive electric machine (EM100) is served as an output/input end, and served for connecting to an action side of the controllable brake device (BK103) while the other action side of the controllable brake device (BK103) is fixed in the housing (H100); the epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) is rotated and sleeved on the rotation shaft (S101) for being served as an output/input end, and the sleeve type rotation shaft (AS101) is connected to an action side of the controllable brake device (BK101) while the other action side of the controllable brake device (BK101) is fixed in the housing (H100); the epicycle gear set (EG101) is also fixed in the housing (H100), and the output wheel (W102) of the epicycle gear set (EG101) being provided for driving the rotation shaft (S102) to be served as an output/input end, and the rotation shaft (S102) is connected to an action side of the controllable brake device (BK102) while the other action side of the controllable brake device (BK102) is fixed in the housing (H100), which mainly consists of:

Epicycle gear set (EG101): constituted by an input wheel (W101) and an output wheel (W102) and at least an epicycle wheel (W103), and including by means of the bevel gears engaging with each other or the bevel friction wheels mutually performing friction transmissions to form the epicycle gear set function, and also constituted by the rotation shaft (S101), the rotation shaft (S102), the rocker arm (A101), the sleeve type rotation shaft (AS101) and a bearing, as well as installed with a shell for being combined in the housing (H100);

The speed ratios of the input wheel (W101) and the output wheel (W102) of the mentioned epicycle gear set (EG101) are the same, and the speed ratios between the above two and the epicycle wheel (W103) can be the same or different; or The speed ratios of the input wheel (W101) and the output wheel (W102) of the mentioned epicycle gear set (EG101) are different, the speed ratios between the epicycle wheel (W103) and the output wheel (W102) can be the same or different, and the speed ratios between the epicycle wheel (W103) and the input wheel (W101) can be the same or different;

Rocker arm (A101): having one end provided for allowing the epicycle wheel (W103) to rotate and link, and the other end axially extending toward the rotation shaft (S101) for being combined with the outer rotation part of electric machine (EM102) and combined with the sleeve type rotation shaft (AS101), and the sleeve type rotation shaft (AS101) is sleeved on one or both of the rotation shaft (S101) and the rotation shaft (S102) and capable of rotating thereon;

Controllable brake device (BK101): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the sleeve type rotation shaft (AS101) or the rocker arm (A101) while the other action side is fixed in the housing (H100);

Controllable brake device (BK102): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S102) while the other action side is fixed in the housing (H100);

Controllable brake device (BK103): constituted by a brake device controlled by a manual force or mechanical force or hydraulic force or pneumatic force or electromagnetic force, and having two controllable action sides for the operations of a brake locking state for engagement or a releasing state for separation, wherein one of the action sides is connected to the rotation shaft (S101) while the other action side is fixed in the housing (H100);

Dual-drive electric machine (EM100): constituted by a DC or AC, brush or brushless, synchronous or non-synchronous dual-drive electric machine, having an inner rotation part of electric machine (EM101) and an outer rotation part of electric machine (EM102), and installed with end covers, bearings and related electric conduction devices used to introduce electric energy, the inner rotation part of electric machine (EM101) and the outer rotation part of electric machine (EM102) are coaxially rotated, wherein the inner rotation part of electric machine (EM101) is combined with the rotation shaft (S101), and the outer rotation part of electric machine (EM102) is combined with the rocker arm (A101);

The rotation shaft (S101) shared by the input wheel (W101) of the epicycle gear set (EG101) and the inner rotation part of electric machine (EM101) of the dual-drive electric machine (EM100) is served as an output/input end, and is served for connecting to an action side of the controllable brake device (BK103) while the other action side of the controllable brake device (BK103) is fixed in the housing (H100);

The epicycle wheel (W103) of the epicycle gear set (EG101) is provided for linking the rocker arm (A101) and combined with the outer rotation part of electric machine (EM102) and combined with the sleeve type rotation shaft (AS101), and the sleeve type rotation shaft (AS101) rotated and sleeved on the rotation shaft (S101) is served as an output/input end, and the sleeve type rotation shaft (AS101) is connected to an action side of the controllable brake device (BK101) while the other action side of the controllable brake device (BK101) is fixed in the housing (H100); the output wheel (W102) of the epicycle gear set (EG101) is provided for driving the rotation shaft (S102) to be served as an output/input end, and the rotation shaft (S102) is connected to an action side of the controllable brake device (BK102) while the other action side of the controllable brake device (BK102) is fixed in the housing (H100);

The operations of the dual-drive electric machine having controllable epicycle gear set as shown in FIG. 7 include one or more than one of following functions:

When the controllable brake device (BK101) and the controllable brake device (BK102) and the controllable brake device (BK103) are all controlled to be in the releasing state, and the dual-drive electric machine (EM100) is not operated with the electric machinery function, the transmission relations between the rotation shaft (S101) and the rotation shaft (S102) and the sleeve type rotation shaft (AS101) are in the releasing state allowing idle rotation;

When the controllable brake device (BK101) and the controllable brake device (BK102) and the controllable brake device (BK103) are all controlled to be in the releasing state, and the dual-drive electric machine (EM100) is operated with the electric machinery function, the corresponding interactive operations of the power generator function or the motor function are correspondingly performed between the inner rotation part of electric machine (EM101) and the outer rotation part of electric machine (EM102), according to the damping of external load or the rotation torque, the rotation speed and the rotation direction of the externally inputted rotary kinetic energy sustained by the rotation shaft (S101), the rotation shaft (S102) and the sleeve type rotation shaft (AS101);

When the controllable brake device (BK101) is controlled to be in the brake locking state, the controllable brake device (BK102) and the controllable brake device (BK103) are controlled to be in the releasing state, and the dual-drive electric machine (EM100) is not operated with the electric machinery function, the transmission relation between the rotation shaft (S101) and the rotation shaft (S102) is in a connecting relation allowing for transmission;

When the controllable brake device (BK101) is controlled to be in the brake locking state, the controllable brake device (BK102) and the controllable brake device (BK103) are controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing correspondingly interactive operations with the damping of external load or the externally inputted rotary kinetic energy sustained by the rotation shaft (S101) and rotation shaft (S102);

When the controllable brake device (BK102) is controlled to be in the brake locking state, the controllable brake device (BK101) and the controllable brake device (BK103) are controlled to be in the releasing state, and the dual-drive electric machine (EM100) is not operated with the electric machinery function, the transmission relation between the rotation shaft (S101) and the sleeve type rotation shaft (AS101) is in a connecting relation allowing for transmission;

When the controllable brake device (BK102) is controlled to be in the brake locking state, the controllable brake device (BK101) and the controllable brake device (BK103) are controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S101) and the sleeve type rotation shaft (AS101);

When the controllable brake device (BK103) is controlled to be in the brake locking state, the controllable brake device (BK101) and the controllable brake device (BK102) are controlled to be in the releasing state, and the dual-drive electric machine (EM100) is not operated with the electric machinery function, the transmission relation between the rotation shaft (S102) and the sleeve type rotation shaft (AS101) is in a connecting relation allowing for transmission;

When the controllable brake device (BK103) is controlled to be in the brake locking state, the controllable brake device (BK101) and the controllable brake device (BK102) are controlled to be in the releasing state, and the dual-drive electric machine (EM100) is operated with the electric machinery function, between the inner rotation part of the electric machine (EM101) and the outer rotation part of the electric machine (EM102) is operated as the power generator function or the motor function, for performing corresponding interactive operations with the damping of external load or the externally inputted rotary kinetic energy sustained by the rotation shaft (S102) and the sleeve type rotation shaft (AS101);

When two or all of the controllable brake device (BK101) and the controllable brake device (BK102) and the controllable brake device (BK103) are controlled to be in the brake locking state, the relations between the rotation shaft (S101), the rotation shaft (S102) and the sleeve type rotation shaft (AS101) are all in the brake locking state.

The interactive operations of corresponding function performed by the mentioned dual-drive electric machine (EM100) include receiving the driving control of externally inputted electric energy, operating as the motor function for individually driving the load, or working with the externally inputted rotation kinetic energy for driving the load;

The interactive operations of corresponding function performed by the mentioned dual-drive electric machine (EM100) include receiving the driving of the externally inputted rotary kinetic energy or the driving of the load inertia kinetic energy for being operated as the power generator function, so as to output the electric energy to drive the external electric load or charge the external electric energy storing device.

The dual-drive electric machine having controllable epicycle gear set can be applied to various load devices which require mechanical output for driving, such as a ground vehicle, rail vehicle, agriculture machineries or agriculture vehicles, excavator, dozer, construction vehicles, transport vehicle, garbage truck, crane, hoisting machine, jack, forklift, water or underwater boat, aircraft, industrial machineries, tool machine, power device, hand-operated tool, robot or mechanical arm, gardening power tool, domestic electric equipment;

According to the dual-drive electric machine having controllable epicycle gear set of the present invention, the sources of externally inputted rotary kinetic energy include an inner combustion engine, an outer combustion engine, a Sterling engine, a steam engine, electric engine, hydraulic engine, pneumatic engine, wind-driven blade device, flow-driven blade device, vapor-driven blade device, human or animal forces.

The invention claimed is:

1. A dual-drive electric machine apparatus having a controllable epicyclic gear set (EG101), comprising:
    an inner rotation part (EM101) combined with an input wheel (W101) of the epicyclic gear set (EG101),
    an outer rotation part (EM102) combined with a rocker arm (A101) of the epicyclic gear set (EG101), wherein:
        the inner rotation part (EM101) and outer rotation part (EM102) magnetically interact to form an electric machine (EM100),
        the input wheel (W101) engages at least one epicyclic wheel (W103) rotatably mounted on the rocker arm (A101), and the at least one epicyclic wheel (W103) engages an output wheel (W102), to form the epicyclic gear set (EG101), said input wheel (W101), output wheel (W102), and epicyclic wheel (W103) each including one of a bevel gear and a bevel friction wheel, and
        said input wheel (W101) is mounted on a first rotation shaft (S101) that forms a first input/output end, said output wheel (W102) is mounted on a second rotation shaft (S102) that forms a second input/output end, and said rocker arm (A101) is combined with a sleeve-shaped rotation shaft (AS101) that surrounds and is rotatable relative to at least one of said first rotation shaft (S101) and said second rotation shaft (S102) to form a third input/output end; and
    at least one of a first, second, and third controllable brake device (BK101, BK102, or BK103) having a first side fixed to a housing (H100) and action side that is fixed to at least one of the sleeve-shaped rotation shaft (AS101) or rocker arm (A101), the first rotation shaft (S101), and the second rotation shaft (S102) for controlling operation interactive operations between the first, second, and third input/output ends and the electric machine (EM100) by locking or releasing said one of the sleeve-shaped rotation shaft (AS101), first rotation shaft (S101), and second rotation shaft (S102).

2. An electric machine apparatus having a controllable epicyclic gear set as claimed in claim 1, wherein a speed ratio between the input wheel (W101) and the output wheel (W102) is 1:1, and respective speed ratios of the input wheel (W101) and output wheel (W102) to the epicyclic wheel (W103) are the same or different.

3. An electric machine apparatus having a controllable epicyclic gear set as claimed in claim 1, wherein a speed ratio between the input wheel (W101) and the output wheel (W102) is different than 1:1, and respective speed ratios of the input wheel (W101) and the output wheel (W102) to the epicyclic wheel (W103) are the same or different.

4. An electric machine apparatus having a controllable epicyclic gear set as claimed in claim 1, wherein said at least one controllable brake device (BK101,BK102,BK103) is controllable by at least one of a manual force, a mechanical force, a hydraulic force, a pneumatic force, and an electromagnetic force.

5. An electric machine apparatus having a controllable epicyclic gear set as claimed in claim 1, wherein said at least one controllable brake device includes said first controllable brake device (BK101), and wherein said first controllable brake device (BK101) is arranged to lock and release the sleeve-shaped rotation shaft (AS101) or rocker arm (A101).

6. An electric machine apparatus having a controllable epicyclic gear set as claimed in claim 5, wherein the electric machine apparatus carries out the following operations:
when the first controllable brake device (BK101) is controlled to be in a releasing state and the electric machine (EM100) is not operated as an electric machine, the first rotation shaft (S101), the second rotation shaft (S102), and the sleeve type rotation shaft (AS101) are in a released state of idle rotation;
when the first controllable brake device (BK101) is controlled to be in a releasing state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
when the first controllable brake device (BK101) is controlled to be in a locking state and the dual-drive electric machine (EM100) is not operated as an electric machine, the first rotation shaft (S101) and the second rotation shaft (S102) are connected for transmission; and
when the first controllable brake device (BK101) is controlled to be in the brake locking state and the dual-drive electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102).

7. An electric machine apparatus having a controllable epicyclic gear set as claimed in claim 1, wherein said at least one controllable brake device includes said second controllable brake device (BK102), and wherein said second controllable brake device (BK102) is arranged to lock and release the second rotation shaft (S102).

8. An electric machine apparatus having a controllable epicyclic gear set as claimed in claim 7, wherein the electric machine apparatus carries out the following operations:
when the second controllable brake device (BK102) is controlled to be in a releasing state and the electric machine (EM100) is not operated as an electric machine, the first rotation shaft (S101), the second rotation shaft (S102), and the sleeve type rotation shaft (AS101) are in a released state of idle rotation;
when the second controllable brake device (BK102) is controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
when the second controllable brake device (BK102) is controlled to be in a brake locking state and the electric machine (EM100) is not operated as an electric machine, the first rotation shaft (S101) and the sleeve type rotation shaft (AS101) are connected for transmission; and
when the second controllable brake device (BK102) is controlled to be in the brake locking state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101).

9. An electric machine apparatus having a controllable epicyclic gear set as claimed in claim 1, wherein said at least one controllable brake device includes said first controllable brake device (BK101) and said second controllable brake device (BK102), and wherein said first controllable brake device (BK101) is arranged to lock and release the sleeve-shaped rotation shaft (AS101) or rocker arm (A101) and said second controllable brake device (BK102) is arranged to be engage and release the second rotation shaft (S102).

10. An electric machine apparatus having a controllable epicyclic gear set as claimed in claim 9, wherein the electric machine apparatus carries out the following operations:
when the first controllable brake device (BK101) and the second controllable brake device (BK102) are both controlled to be in a releasing state and the electric machine (EM100) is not operated as an electric machine, the first rotation shaft (S101), the second rotation shaft (S102), and the sleeve type rotation shaft (AS101) are in a released state of idle rotation;
when the first controllable brake device (BK101) and the second controllable brake device (BK102) are both controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);
when the first controllable brake device (BK101) is controlled to be in the brake locking state, the second controllable brake device (BK102) is controlled to be in the releasing state, and the dual-drive electric machine (EM100) is not operated as an electric machine, the first rotation shaft (S101) and the second rotation shaft (S102) are connected for transmission;
when the first controllable brake device (BK101) is controlled to be in the brake locking state, the second controllable brake device (BK102) is controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the first controllable brake device (BK101) is controlled to be in the releasing state, the second controllable brake device (BK102) is controlled to be in the brake locking state, and the electric machine (EM100) is not operated as an electric machine, the first rotation shaft (S101) and the sleeve type rotation shaft (AS101) are connected for transmission;

when the first controllable brake device (BK101) is controlled to be in the releasing state, the second controllable brake device (BK102) is controlled to be in the brake locking state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101); and when the first controllable brake device (BK101) and the second controllable brake device (BK102) are both in the brake locking state, the first rotation shaft (S101), the second rotation shaft (S102) and the sleeve type rotation shaft (AS101) are all locked.

11. An electric machine apparatus having a controllable epicyclic gear set as claimed in claim 1, wherein said at least one controllable brake device includes said third controllable brake device (BK103), and there said third controllable brake device (BK103) locks and releases the first rotation shaft (S101).

12. An electric machine apparatus having a controllable epicyclic gear set as claimed in claim 11, wherein the electric machine apparatus carries out the following operations:

when the third controllable brake device (BK103) is controlled to be in a releasing state and the electric machine (EM100) is not operated as an electric machine, the first rotation shaft (S101), the second rotation shaft (S102), and the sleeve type rotation shaft (AS101) are in a released state of idle rotation;

when the third controllable brake device (BK103) is controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the third controllable brake device (BK103) is controlled to be in a brake locking state and the electric machine (EM100) is not operated as an electric machine, the sleeve type rotation shaft (AS101) and the second rotation shaft (S102) are connected for transmission; and when the third controllable brake device (BK103) is controlled to be in the brake locking state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the second rotation shaft (S102).

13. An electric machine apparatus having a controllable epicyclic gear set as claimed in claim 1, wherein said at least one controllable brake device includes said second controllable brake device (BK102) and said third controllable brake device (BK103), and wherein said second controllable brake device (BK102) locks and releases the second rotation shaft (S102) and said third controllable brake device (BK103) locks and releases the first rotation shaft (S101).

14. An electric machine apparatus having a controllable epicyclic gear set set as claimed in claim 13, wherein the electric machine apparatus carries out the following operations:

when the second controllable brake device (BK102) and the third controllable brake device (BK103) are both controlled to be in a releasing state and the electric machine (EM100) is not operated as an electric machine, the first rotation shaft (S101), the second rotation shaft (S102), and the sleeve type rotation shaft (AS101) are in a released state of idle rotation;

when the second controllable brake device (BK102) and the third controllable brake device (BK103) are both controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the second controllable brake device (BK102) is controlled to be in the brake locking state, the third controllable brake device (BK103) is controlled to be in the releasing state, and the electric machine (EM100) is not operated as an electric machine, the sleeve type rotation shaft (AS101) and the first rotation shaft (S101) are connected for transmission;

when the second controllable brake device (BK102) is controlled to be in the brake locking state, the third controllable brake device (BK103) is controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the sleeve type rotation shaft (AS101) and the first rotation shaft (S101);

when the second controllable brake device (BK102) is controlled to be in the releasing state, the third controllable brake device (BK103) is controlled to be in the brake locking state, and the electric machine (EM100) is not operated as an electric machine, the second rotation shaft (S102) and the sleeve type rotation shaft (AS101) are connected for transmission;

when the second controllable brake device (BK102) is controlled to be in the releasing state, the third controllable brake device (BK103) is controlled to be in the brake locking state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when the second controllable brake device (BK102) and the third controllable brake device (BK103) are both in the brake locking state, the first rotation shaft (S101), the second rotation shaft (S102) and the sleeve type rotation shaft (AS101) are all locked.

15. A dual drive electric machine having a controllable epicyclic gear set as claimed in claim 1, wherein said at least one controllable brake device includes said first controllable brake device (BK101) and said third controllable brake device (BK103), and wherein said first controllable brake device (BK101) locks and releases the sleeve-shaped rotation shaft (AS101) or rocker arm (A101) the third controllable brake device (BK103) locks and releases the first rotation shaft (S101).

16. An electric machine apparatus having a controllable epicyclic gear set as claimed in claim 15, wherein the electric machine apparatus carries out the following operations:

when the first controllable brake device (BK101) and the third controllable brake device (BK103) are both controlled to be in a releasing state and the electric machine (EM100) is not operated as an electric machine, the first rotation shaft (S101), the second rotation shaft (S102), and the sleeve type rotation shaft (AS101) are in a released state of idle rotation;

when the first controllable brake device (BK101) and the third controllable brake device (BK103) are both controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the third controllable brake device (BK103) is controlled to be in the releasing state, and the electric machine (EM100) is not operated as an electric machine, the first rotation shaft (S101) and the second rotation shaft (S102) are connected for transmission;

when the first controllable brake device (BK101) is controlled to be in the brake locking state, the third controllable brake device (BK103) is controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the first controllable brake device (BK101) is controlled to be in the releasing state, the third controllable brake device (BK103) is controlled to be in the brake locking state, and the electric machine (EM100) is not operated as an electric machine, the second rotation shaft (S102) and the sleeve type rotation shaft (AS101) are connected for transmission;

when the first controllable brake device (BK101) is controlled to be in the releasing state, the third controllable brake device (BK103) is controlled to be in the brake locking state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when the first controllable brake device (BK101) and the third controllable brake device (BK103) are both in the brake locking state, the first rotation shaft (S101), the second rotation shaft (S102) and the sleeve type rotation shaft (AS101) are all locked.

17. An electric machine apparatus having a controllable epicyclic gear set as claimed in claim 1, wherein said at least one controllable brake device includes said first controllable brake device (BK101), said second controllable brake device (BK102), and said third controllable brake device (BK103), and wherein the first controllable brake device (BK101) locks and releases the sleeve-shaped rotation shaft (AS101) or rocker arm (A101), the second controllable brake device (BK102) locks and releases the second rotation shaft (S102), and the third controllable brake device (BK103) locks and releases the first rotation shaft (S101).

18. An electric machine apparatus having a controllable epicyclic gear set as claimed in claim 17, wherein the electric machine apparatus carries out the following operations:

when the first controllable brake device (BK101), the second controllable brake device (BK102), and the third controllable brake device (BK103) are all controlled to be in a releasing state and the electric machine (EM100) is not operated as an electric machine, the first rotation shaft (S101), the second rotation shaft (S102), and the sleeve type rotation shaft (AS101) are in a released state of idle rotation;

when the first controllable brake device (BK101), and the second controllable brake device (BK102), and the third controllable brake device (BK103) are all controlled to be in the releasing state and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101), second rotation shaft (S102), and the sleeve like rotation shaft (AS101);

when the first controllable brake device (BK101) is controlled to be in the brake locking state, the second controllable brake device (BK102) and the third controllable brake device (BK103) are both controlled to be in the releasing state, and the electric machine (EM100) is not operated as an electric machine, the first rotation shaft (S101) and the second rotation shaft (S102) are connected for transmission;

when the first controllable brake device (BK101) is controlled to be in the brake locking state, the second controllable brake device (BK102) and the third controllable brake device (BK103) are both controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the second rotation shaft (S102);

when the second controllable brake device (BK102) is controlled to be in the brake locking state, the first controllable brake device (BK101) and the third controllable brake device (BK103) are both controlled to be in the releasing state, and the electric machine (EM100) is not operated as an electric machine, the first rotation shaft (S101) and the sleeve type rotation shaft (AS101) are connected for transmission;

when the second controllable brake device (BK102) is controlled to be in the brake locking state, the first controllable brake device (BK101) and the third controllable brake device (BK103) are both controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the first rotation shaft (S101) and the sleeve type rotation shaft (AS101);

when the third controllable brake device (BK103) is controlled to be in the brake locking state, the first controllable brake device (BK101) and the second controllable brake device (BK102) are both controlled to be in the releasing state, and the dual-drive electric machine (EM100) is not operated as an electric machine, the second rotation shaft (S102) and the sleeve type rotation shaft (AS101) are connected for transmission;

when the third controllable brake device (BK103) is controlled to be in the brake locking state, the first controllable brake device (BK101) and the second controllable brake device (BK102) are both controlled to be in the releasing state, and the electric machine (EM100) is operated as an electric machine, the inner rotation part (EM101) and the outer rotation part (EM102) interact to provide a power generator or motor function according to a damping external load or an external rotational torque, rotational speed, and rotational direction applied to at least one of the second rotation shaft (S102) and the sleeve type rotation shaft (AS101); and when at least two of the first controllable brake device (BK101), the second controllable brake device (BK102), and the third controllable brake device (BK103) are in the brake locking state, the first rotation shaft (S101), the second rotation shaft (S102) and the sleeve type rotation shaft (S103) are all locked.

* * * * *